Figure 1:
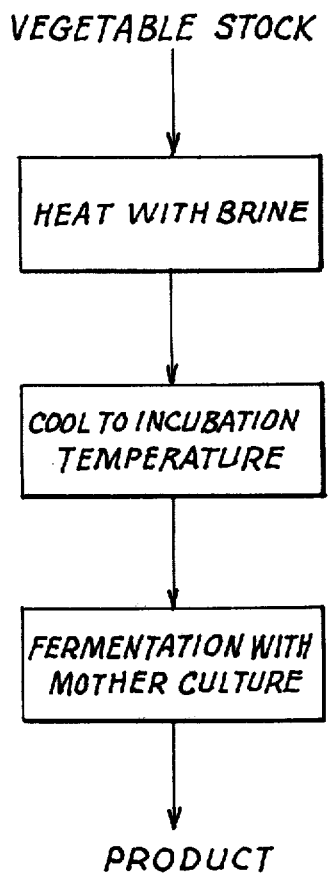

United States Patent [19]
Green et al.

[11] 3,891,771

[45] June 24, 1975

[54] METHOD OF MANUFACTURING FERMENTED VEGETABLE PRODUCTS

[75] Inventors: Dan E. Green; L. Mark Hanover, both of Rockford, Ill.

[73] Assignee: Dean Foods Company, Rockford, Ill.

[22] Filed: Nov. 1, 1973

[21] Appl. No.: 411,685

[52] U.S. Cl. .................. 426/52; 426/7; 426/49
[51] Int. Cl. ............................................ A23b 7/10
[58] Field of Search .................. 426/49, 52, 53, 7, 8

[56] References Cited
UNITED STATES PATENTS
3,403,032  9/1968  Etchells et al. .................. 426/8
FOREIGN PATENTS OR APPLICATIONS
1,816,168  4/1970  Germany ........................ 426/49

*Primary Examiner*—A. Louis Monacell
*Assistant Examiner*—Esther L. Massung

[57] ABSTRACT

A method for the manufacture of fermented vegetable products in which a finely divided vegetable is contacted with hot water to heat the vegetable to its pasteurization temperature and to leach fermentable carbohydrates from the vegetable, cooling the vegetable and inoculating it in contact with the brine produced by the leaching with a mother culture of the vegetable inoculated with a lactic acid producing bacteria having a titratable acidity of up to 0.5% by weight.

24 Claims, 2 Drawing Figures

METHOD OF MANUFACTURING FERMENTED VEGETABLE PRODUCTS

This invention relates to a process for the manufacture of fermented vegetable products, and more particularly to the manufacture of pickles by fermentation of cucumbers.

Classic methods for the preparation of fermented vegetable products, such as the manufacture of pickles by fermentation of cucumbers, date back many years. Such methods generally involve contacting the vegetable with brine for periods of three to four weeks. Fermentation is induced by microorganisms which occur naturally on the vegetables being processed and/or micro-organisms contained in the ambient environment. For this reason, such fermentation reactions are difficult to control since the active micro-organism may vary from batch to batch.

One of the most serious drawbacks to the classic methods as outlined above stems from the fact that the fermentation process occurs over extended periods of time. This is not only an economic disadvantage but also increases the chances of contamination of the fermentation products by deleterious foreign materials.

Various attempts have been made to more closely control the fermentation process in an effort to avoid dependence on transient micro-organisms and to reduce the fermentation time required. For example, in U.S. Pat. No. 3,255,019, it is suggested that the fermentation be carried out in brine in which the salt concentration is closely controlled.

It has been suggested in U.S. Pat. No. 3,403,032 that the fermentation of cucumbers can be carried out by just contacting the cucumbers with water heated to an elevated temperature to destroy asporogenous micro-organisms and heat-labile enzymes followed by contact with cool, sterilized salt brine. The cucumbers in brine are inoculated with pure culture lactic acid-producing bacteria for fermentation over a period of three to four days.

However, methods of the type described in the foregoing patents have not been completely satisfactory in the manufacture of fermented vegetable products having the desired appearance, flavor, odor and firmness. In addition, long processing times are still required by such processes.

In addition, such methods of the prior art make extensive use of sodium chloride brine solutions as the fermentation medium; the use of such brine solutions is disadvantageous since such brine solutions severely limit the processing equipment which can be used.

It is accordingly an object of the present invention to provide a process for the fermentation of vegetable products which overcomes the foregoing disadvantages.

It is a more specific object of the invention to provide a process for the manufacture of fermented vegetable products which is capable of producing a product having improved appearance, flavor, odor and texture in relatively short processing times without the need to employ salt brine.

Figure 2:
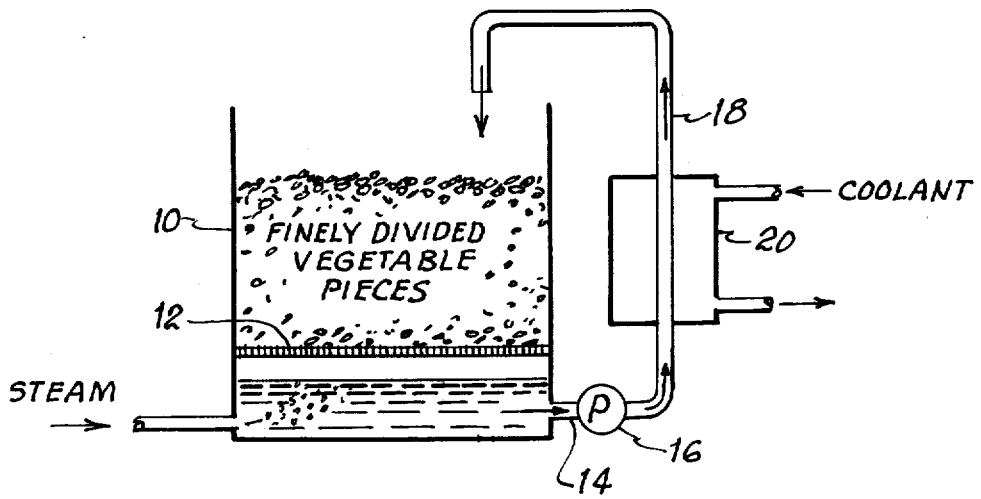

These and other objects and advantages of the invention will appear more fully hereinafter and, for the purpose of illustration but not of limitation, an embodiment is shown in the accompanying drawing in which:

FIG. 1 is a schematic block diagram illustrating the processing steps in the practice of this invention; and, FIG. 2 is a schematic plan view illustrating a treating vessel of the type preferably employed in the practice of the invention.

The concepts of the present invention reside in an improved process for the manufacture of fermented vegetable products in which the fermentation is carried out in extremely short reaction times without the need to employ salt brine. In accordance with the practice of the invention, finely divided chunks or pieces of a vegetable are contacted with hot water to heat the vegetables to the pasteurization temperature to leach out fermentable carbohydrates, and then cooled to a temperature at which lactic acid-producing micro-organisms can incubate. After cooling, the vegetable pieces are admixed with a mother culture to effect the fermentation.

The mother culture employed in the practice of this invention is prepared by blanching a vegetable which is the same as that to be fermented, and then inoculating the blanched vegetable with a culture of a lactic acid-producing bacteria. The blanched and inoculated vegetable is then allowed to incubate for a time sufficient to produce a fermented mother culture having titratable activity as lactic acid of from 0.1 to 0.5 percent by weight.

The blend of the mother culture and the vegetable chunks constituting the green stock is then allowed to incubate in the presence of the water containing the leached carbohydrates until fermentation is complete. Usually, this occurs within 12 to 48 hours.

It has been found that the process of this invention provides fermented vegetable products, and particularly pickles, having improved appearance and color, flavor, odor and texture in extremely short processing times as compared to the prior art. The steps as described above insure complete fermentation of all available carbohydrates or reducing sugars in a rapid and economical manner.

The concepts of the invention are particularly suitable for the manufacture of pickles from cucumbers. However, the invention can also be employed in the manufacture of fermented products from other vegetables including broccoli, onions, carrots, green peppers, beets, turnips, cauliflower, tomatoes, etcetera.

Referring now to the drawing for a more detailed description of the invention, there is shown in FIG. 1 a block diagram of the process steps of the invention, and one preferred form of the apparatus used in the practice of the invention.

The vegetable to be processed is first reduced to a finely divided form by any conventional means such as dicing, cutting, etcetera, and then loaded into the vessel shown in FIG. 2. The size of the vegetable pieces employed is not critical to the practice of the invention, and is sufficient to provide a bed of vegetable slices having a relatively high ratio of surface area to volume to permit complete extraction of fermentable carbohydrates (i.e., reducing sugars). It has been found best results are usually obtained for cubed pieces where the vegetable pieces have a maximum dimension of 0.1 to 1.5 inches.

The vessel 10 as shown in FIG. 2 of the drawing can be any type of vat or the like of the type conventionally used in food processing. The vessel 10 is provided with a foraminous screen or false bottom 12 to support the vegetables loaded therein above the bottom of the vessel 10. The vessel 10 is also provided with a circulation system to continuously recirculate the contents of the bottom of the vessel to the vegetable pieces forming a packed bed above the foraminous support 12. Thus, the liquid from the bottom of the vessel is withdrawn through line 14 by means of a pump 16 for passage through a recirculation line 18 which distributes the liquid over the packed bed of vegetable pieces. As shown in FIG. 2, recirculation line 18 is also provided with heat exchange means 20 to provide the desired capacity to cool the liquid being recirculated.

Thus, the finely divided vegetable pieces are loaded into the vessel 10 which is supplied with water in an amount sufficient to substantially fill the vessel 10 at a level below the foraminous support 12 whereby the packed bed is maintained out of contact with the liquid body of water in the bottom of the vessel 10 below the support 12.

The relative proportions of water to vegetable pieces can be varied over wide limits, depending somewhat on the vegetable employed. Best results are usually obtained where the weight ratio of water to vegetable solids is within the range of 10 parts of weight water to 90 parts by weight vegetable solids to about 70 parts by weight water to 30 parts by weight vegetable solids.

The vegetable chunks or pieces in the vessel 10 above the foraminous support 12 by contact with the water below the foraminous support 12 which is heated and recirculated through the packed bed formed by the vegetable stock by way of the recirculation line 18. In the preferred practice of the invention as illustrated in FIG. 2, the water is heated by infusing steam directly into the water below the support 12. The steam not only serves to heat the water, which is recirculated to the top of the bed of vegetable stock in the vessel 10, but also percolates up through the foraminous support 12 into the bed which is maintained out of direct contact with the body of water below the support 12.

Alternatively, the steam can also be injected directly into the recirculation line 18 to heat the water being continuously recirculated therethrough. In this variation, the steam not only serves to heat the water but also aids in the recirculation of the water.

The heating of the vegetable stock in the vessel should be carried out at a temperature and for a time sufficient to inactivate or destroy the particular enzymes associated with the vegetable undergoing processing. As is known to those skilled in the art, certain enzymes are associated with various vegetables, and these enzymes adversely affect the vegetables. For example, pectin esterase is usually associated with cucumbers and attacks the pectin of cucumbers, thereby resulting in softness in the product. The enzymes peroxidase and catalase are associated with various other vegetables including broccoli, and adversely affect such vegetables.

As will be appreciated by those skilled in the art, the duration for which the vegetable is heated and the temperature to which it is heated are interdependent factors in the pasteurization of the vegetable to destroy such enzymes. Similarly, the temperature and time vary somewhat for the vegetable involved; for example, peroxidase is more stable against heat than pectin esterase, and consequently broccoli is heated to a higher temperature than cucumbers. In general, the pasteurization temperature employed to deactivate such enzymes in accordance with the practice of this invention ranges from 130 to 210° F., and the heating times range from 0.1 to 100 minutes.

The continuous recirculation of the water through the vegetable stock forming the packed bed also serves to leach juices and fermentable carbohydrates or reducing sugars from the vegetable in the bed to form a brine solution. The term "brine" is used in this sense to define the aqueous extract from the vegetables, and not a salt brine. The hot water also serves to blanch the vegetable and thereby assure that the fermented product will have the desired color.

After the vegetable in the vessel is heated by means of the circulating water or "brine", recirculation of the brine is continued but the heating of the brine, as by infusion of steam, is stopped to permit cooling of the vegetable stock to a temperature at which lactic acid-producing bacteria can incubate. In the preferred practice of the invention, a cooling fluid is supplied to the heat exchanger 20 to cool the "brine" being recirculated. The cooling operation is then continued until the desired incubation temperature is reached, usually a temperature within the range of 55° to 100° F., and preferably 85° to 95° F.

Once the vegetable has been cooled to the desired incubation temperature, the vegetable stock in the vessel 10 is admixed with a mother culture containing lactic acid-producing bacteria. The mother culture is prepared by blanching a vegetable stock in the form of chunks or pieces of the same vegetable as forms the green or vegetable stock at an elevated temperature, usually a temperature from 160° to 210° F., and then cooled to the incubation temperature. The cooled, blanched vegetable, which is preferably cut or chopped to substantially the same size as the vegetable stock in the vessel, is then inoculated with a culture of a lactic acid-producing bacteria.

The lactic acid-producing bacteria which can be employed in the practice are from the genera Lactobacillus, Pediococcus and Leuconostoc, and are described in U.S. Pat. No. 3,410,755. Suitable species include *Lactobacillus bulgaricus, L. Brevis, L. delbrueckii, L. fermenti, L. helveticus, L. lactis, L. plantarum, L. thermophilus, Pediococcus cerevisiae,* and *Leuconostoc mesenteroides*.

The amount of lactic acid-producing bacteria employed in the preparation of the mother culture is not critical, and can be varied over wide limits. In general, use is made of 0.1 to about 0.5 ml of culture per pound of vegetable in the mother culture. Incubation of the mother culture is carried out for a time sufficient to provide a titratable acidity as lactic acid of 0.1 to 0.5 percent, and the mother culture is then ready for use.

The amount of mother culture added to the vegetable stock can similarly be varied within relatively wide limits. It is generally desirable to employ from 1 to 5 percent by weight of the mother culture based on the weight of the vegetable stock. The resulting blend is then allowed to incubate until the fermentation is complete. It is an important concept of the invention that the fermentation be carried out in the presence of the "brine" resulting from the treatment of the vegetable stock which contains the fermentable carbohydrates or reducing sugar. It is frequently convenient to carry out the fermentation reaction in the vessel 10. The volume of the "brine" increases as the juices are extracted from the vegetable stock during the leaching operation and as steam supplied to the vessel 10 is condensed therein. Consequently, the level of the "brine" rises above the support 12 as a result of the thermal treatment of the vegetable stock, and the volume of "brine" is usually sufficient so that the vegetable stock containing the mother culture can be completely immersed in the "brine" for the fermentation reaction. It is possible, if desired, to transfer the vegetable stock containing the mother culture and its associated "brine" to another reaction vessel.

The fermentation reaction is considered to be complete when the titratable acidity or lactic acid reaches 0.3 to 0.8 percent. The complete reaction can be achieved in a relatively short time, usually 12 to 30 hours, to provide a highly economical process. Since such short fermentation times can be used, the risk of contamination of the reaction mixture by foreign debris or the like is minimal.

While the process has been described above with reference to the use of a mother culture, it will be understood by those skilled in the art that the process of this invention can also be practiced by direct inoculation of the vegetable, which has been cooled to the desired inoculation temperature, with a culture of the lactic acid producing bacteria. It has been found economically desirable to employ a mother culture since the use of such a technique requires the utilization of a minimum quantity of the lactic acid producing bacteria culture. If desired, however, the direct inoculation technique may be employed, using concentrated culture of the bacteria in larger amounts.

The fermented vegetable products of this invention can be used in conventional manner in the preparation of food products. Pickles produced by fermentation of cucumbers in accordance with the preferred practice of this invention are ideally suited for use in the manufacture of relish products including dill relish and low acid/low Baume sweet relish in accordance with known techniques.

Having described the basic concepts of the invention, reference is now made to the following examples which are provided by way of illustration, but not of limitation.

EXAMPLE 1

This example illustrates the manufacture of pickles from fresh, green cucumbers.

Fresh, green cucumbers are washed, inspected to remove the rotten or discolored, and then are diced with an Urschel slicer-dicer set to provide chunks having dimensions of ¾ inch by ¾ inch by ¾ inch. The chunked stock is then passed over a vibrating screen (7/16 inch mesh) to remove fines. The stock is then recovered and loaded into a process vessel of the type shown in FIG. 2 of the drawing.

The process vessel is filled with water at a level up to the level of the support 12 prior to introduction of the green stock. Steam was infused to the water in the bottom of the vessel, and was recirculated through the recirculation line 18 for about 30 minutes to heat the green stock to a temperature of about 170°F. Introduction of the steam is stopped, and cooling water is introduced to the heat exchanger as the "brine" formed by contact of the hot water with the chopped cucumbers is continuously circulated from the bottom of the vessel to the bed of chopped cucumbers as the "brine" is cooled by the heat exchanger to thereby cool the bed. After the cooling is carried out for 45 to 60 minutes, the temperature of the cucumber is about 90°F.

As the cucumbers forming the green stock in the vessel are being treated, fresh green cucumbers are milled through a 3AA screen with a Fitzmill. The mash resulting therefrom is blanched at 200° F. with a tube heat exchanger and cooled to 90° F. The blanched mass is then inoculated with a pure culture of *Lactobacillus plantarum* at a rate of 0.25 ml of culture per pound of mash.

The mother culture is then incubated at 90° F., and the titratable acidity is monitored. When the titratable acidity (as lactic acid) of the mother culture reaches 0.25 to 0.30 percent, 2.5 percent by weight of the mother culture is inoculated into the vessel containing the treated cucumbers and "brine" resulting from the treatment of the cucumbers. To insure contact between the cucumbers and the brine in the vessel, the cucumbers are pressed against the support 12.

The vessel is then covered, and allowed to stand quiescently, as the titratable acidity is monitored. After about 24 hours, it is found that the titratable acidity is 0.6 percent lactic acid, and the fermentation is deemed complete.

It is found that the resulting pickles had good flavor, color and texture, and can be used in the manufacture of relishes as desired.

EXAMPLE 2

The example illustrates the manufacture of fermented products from other vegetables in accordance with the concepts of the invention.

Using the procedure described in Example 1, various fresh vegetables are cut, and heated to 170° F. for 15 minutes and then cooled to 90° F. Thereafter, the treated vegetables, immersed in the "brine" produced, are inoculated in a mother culture inoculated with *L. Plantarum* as described in Example 1. In such case, the vegetable used in the preparation of the mother culture are the same as those treated in the vessel.

The results are shown in the following table:

| Vegetable | Flavor and texture evaluation |
| --- | --- |
| Onion | Acceptable |
| Broccoli | Acceptable |
| Green peppers | Good flavor and texture but soft |
| Carrots | Good flavor and crisp |
| Turnips | Good flavor, texture soft and poor color |
| Green tomatoes | Good texture |
| Cauliflower | Good flavor and texture; flavor weak |
| Red beets | Excellent |

It will be understood that various changes and modifications can be made in the details of formulation, procedure and use without departing from the spirit thereof, particularly as defined in the following claims.

We claim:

1. A method for the production of fermented vegetables comprising the steps of contacting a finely divided vegetable with hot water to heat the vegetable to its pasteurization temperature and to leach fermentable carbohydrates therefrom and thereby form an aqueous extract; cooling the vegetable and the aqueous extract to a temperature for incubation of lactic acid producing bacteria; inoculating the vegetable in contact with the aqueous extract with a mother culture produced by blanching a vegetable, subsequently inoculating the blanched vegetable with lactic acid producing bacteria and incubating the resulting mother culture until the titratable acidity as lactic acid of the mother culture is up to 0.5 percent by weight; and incubating the vegetable in contact with the aqueous extract in the presence of the mother culture until fermentation is complete.

2. A method as defined in claim 1 wherein the mother culture is incubated until the titratable acid reaches a level within the range of 0.1 to 0.5 percent.

3. A method as defined in claim 1 wherein the vegetable in contact with the aqueous extract is incubated in the presence of the mother culture for 12 to 48 hours.

4. A method as defined in claim 1 wherein the vegetables are heated with the hot water by supporting the vegetables above a body of the hot water and continuously recirculating the body of hot water over the vegetables.

5. A method as defined in claim 4 wherein the water is heated by infusing steam into the body of water.

6. A method as defined in claim 4 wherein the vegetables are cooled by cooling the water recirculated.

7. A method as defined in claim 1 wherein the ratio of water to vegetables is within the range of 10:90 to 70:30.

8. A method as defined in claim 1 wherein the vegetable is heated to a temperature sufficient to destroy or inactivate enzymes associated with the vegetable which would otherwise deleteriously affect the softness of the vegetable.

9. A method as defined in claim 1 wherein the vegetable is heated to a temperature within the range of 130° to 210°F.

10. A method as defined in claim 1 wherein the vegetable is cooled to a temperature within the range of 55° to 100°F.

11. A method as defined in claim 1 wherein the lactic acid producing bacteria is from the genera selected from the group consisting of Lactobacillus, Pediococcus and Leuconostoc, and mixtures thereof.

12. A method as defined in claim 1 wherein the lactic acid producing bacteria is *L. plantarum*.

13. A method as defined in claim 1 wherein the amount of bacteria employed in the preparation of the mother culture is within the range of 0.1 to 0.5 ml of culture per pound of mother culture.

14. A method as defined in claim 1 wherein the amount of mother culture employed to inoculate the vegetable is within the range of 1 to 5 percent by weight.

15. A method as defined in claim 1 wherein the fermentation is carried out until the titratable acidity is within the range of 0.3 to 0.8 percent lactic acid.

16. A method as defined in claim 1 wherein the finely divided vegetable is in the form of a slice.

17. A method as defined in claim 1 wherein the finely divided vegetable is a diced vegetable.

18. A method for the production of fermented vegetables comprising the steps of contacting a finely divided vegetable with hot water to heat the vegetable to its pasteurization temperature and to leach fermentable carbohydrates therefrom and thereby form an aqueous extract; cooling the vegetable and the aqueous extract to a temperature for incubation of lactic acid producing bacteria; inoculating the vegetable in contact with the aqueous extract with a culture of lactic acid producing bacteria in an amount sufficient to ferment the available carbohydrates present in the aqueous extract; and incubating the vegetable in contact with the aqueous extract in the presence of the said culture until fermentation is complete.

19. A method as defined in claim 18 wherein the vegetable in contact with the aqueous extract is incubated in the presence of the mother culture for 12 to 48 hours.

20. A method as defined in claim 18 wherein the vegetables are heated with the hot water by supporting the vegetables above a body of the hot water and continuously recirculating the body of hot water over the vegetables.

21. A method as defined in claim 20 wherein the vegetables are cooled by cooling the water recirculated.

22. A method as defined in claim 18 wherein the vegetable is heated to a temperature sufficient to destroy or inactivate enzymes associated with the vegetable which would otherwise deleteriously affect the softness of the vegetable.

23. A method as defined in claim 18 wherein the lactic acid producing bacteria is from the genera selected from the group consisting of Lactobacillus, Pediococcus and Leuconostoc, and mixtures thereof.

24. A method as defined in claim 18 wherein the fermentation is carried out until the titratable acidity is within the range of 0.3 to 0.8 percent lactic acid.

* * * * *